United States Patent Office 3,544,400
Patented Dec. 1, 1970

3,544,400
METHOD AND MASKANT COMPOSITION FOR CHEMICAL MILLING OR PLATING
Henry M. Deutsch, Fullerton, Calif., assignor to Organocerams, Inc., Placentia, Calif., a corporation of California
No Drawing. Filed May 29, 1967, Ser. No. 642,198
Int. Cl. C23f 1/02, 1/04
U.S. Cl. 156—13
14 Claims

ABSTRACT OF THE DISCLOSURE

A low solvent, high resin solids containing maskant forming liquid composition including a low molecular weight liquid diene prepolymer having end and side chain functionality such as, a 1000–2000 equivalent weight hydroxyl, thiol, chloro or isocyanate terminated and side chain modified diene polymer having a functionality of at least 2 and a cross-linking and curing agent such as a polyisocyanate, polyamide, polyol, or polybasic acid, acid chloride or anhydride. Said composition being curable to form a polymeric maskant having a molecular weight greater than 20,000.

The maskant is applied to a metal article by a one pass spray, dip, brush or forced flow, and is cured in place to form a bubble and cob-web free muskant film of a thickness from 5 to 20 mils. The maskant film may contain aluminum, magnesium or calcium silicate fillers such that it is translucent as applied but becomes visible in regions that are mechanically stressed. A portion of the maskant is removed from the area to be etched and selective chemical milling or plating is effected by subjecting the exposed area to an etchant that dissolves the metal or to a chemical plating bath to deposit metal in the exposed area.

BACKGROUND OF THE INVENTION

Field of the invention

The present invention relates to maskant forming liquid compositions and to methods of preparing and utilizing such compositions in chemical milling and plating of metal articles.

Description of the prior art

A sophisticated art of precision, selective etching or plating of metal workpieces known as chemical milling has developed in which portions of a metal object are removed or additional metal is added to obtain an article having a desired structural or ornamental configuration. The metal pieces are coated with several layers of a liquid maskant forming material which, when cured, provides a resilient, peelable film resistant to the etchant or plating bath employed in the process. The maskant is then scribed and cut through with a sharp knife in the selected area to be etched or plated and this portion is removed from the maskant by peeling.

The currently used chemical milling maskants are prepared from relatively low solids solutions or dispersions generally containing less than about 45% of high molecular weight prepolymerized elastomeric or elastoplastic resins. In order to have workable viscosities and to reduce bubbling and cobwebbing during application, the resin forming liquid is usually further diluted to about 25 to 30% solids before application to the workpiece. In a 50% solids solution, solids only comprise 35% of the volume and therefore the wet thickness is about three times the dry thickness and multiple consecutive coatings, of at least three layers with inter-spaced drying are necessary to build up the appropriate film thickness without sagging, cobwebbing or bubbling.

This procedure is not only time consuming but the elimination of the solvent vapors presents toxicity and flamability hazards and uniform film thickness is difficult to attain by means of the multiple coating procedure. Furthermore, bulk volume of the product is unnecessarily high and excessive solvent losses add increased expense with no compensatory advantages.

SUMMARY OF THE INVENTION

However, according to the present invention, a resilient maskant coating having a dry thickness from 5 to about 20 mils can be applied in a single pass without bubbling or sagging and when cured results in a continuous film of maskant that is sufficiently adhered to the metal base so that no leakage of etchant or plating solution occurs between the maskant and the base, yet the maskant is sufficiently cohesive, that is, has sufficiently high tensile strength, so as to be manually peelable after the etchant or plating step is completed. The maskant is chemically resistant to either acid or basic etchants.

The maskant compositions of the invention may be short or long pot life materials curable at room or elevated temperature. A further desired preferred characteristic of the maskants is tanslucency as applied but possessing the ability to turn opaque under mechanical stress permitting the total etch pattern to be either prescribed on the substrate article or to be scribed onto the maskant before immersion into the etching bath.

DESCRIPTION OF THE PREFERRED EMBODIMENT

It has been found that maskant films of sufficient thickness and possessing very desirable properties when cured can be applied by a single pass of a curable low molecular weight liquid elastomer or elastoplastic resin forming solution or dispersion that requires little or no volatile solvent to reduce application viscosity. The high solids low solvent solutions are possible according to the invention since the maskant forming compositions contain as an essential component a liquid polymer which is modified to contain reactive end and/or side groups capable of in situ cross-linking or chain extending to form high tensile strength continuous polymers.

The liquid prepolymers employed are preferably of the diene elastomer type, for example, polymers of a conjugated diene containing from 4 to 12 carbon atoms per molecule and preferably 4 to 8 carbon atoms per molecule, such as 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. The conjugated diene may also contain halogen and lower alkoxy substituents along the chain such as, chloroprene, fluoroprene, 2-methoxy-1,3-butadiene, 2-ethoxy-3-ethyl-1,3-butadiene, and 2-ethoxy-3-methyl-1,3-hexadiene.

The commoner should not exceed 35% of the polymer in order to preserve the elastomeric properties. Suitable commoners are vinyl compounds such as, vinyl-substituted aromatic and aliphatic compounds. Examples of commoners that can be employed in the elastomer forming liquid prepolymers of the invention include acrylonitrile, methacrylonitrile, propylene, butene, isobutylene, styrene, 1-vinylnaphthalene, 2-vinylnaphthalene, and alkyl, cycloalkyl, aryl, alkaryl, aralkyl, alkoxy, aryloxy, and dialkylamino derivatives thereof.

The equivalent weight of the liquid prepolymer is at least a thousand but not more than five thousand. The functionality of the prepolymer is advantageously slightly over 2, but less than 5 to form by cross-linking and chain-extending final polymers of molecular weight of at least 20,000. With the higher molecular weight prepolymers, it may be necessary to apply heat to reduce viscosity before applying the composition to the substrate. Therefore, the equivalent weight is preferably from 1000 to 3000.

Functionality is added by reactive terminal and side groups which may be at least one of thiol, (—SH) carboxyl, (—COOH) hydroxyl (—OH), allylic chlorine (—C=Cl) or isocyanate (—C—N=O). Upon addition of polyfunctional reactive coupling agents and suitable catalysts or accelerators, the low molecular weight liquid reacts in place on the workpiece either at ambient or elevated temperatuer to produce a high molecular weight fully compounded polymeric maskant. The functionality is preferably maintained within the range of 2.1 to about 2.5 in order that excessive cross-linking does not transform the product into too plastic a state and thus reduce the resilient properties desirable for proper chemical milling masking purposes.

The diene prepolymers preferably contain a minimum amount suitably below 40% of 1,2 addition units to avoid excessive decrease of elastomeric properties. A suitable material, Poly V.D. (Sinclair Chemicals) is a polymer of equivalent weight of about 1000-2000 and has a functionality slightly greater than two and comprises 60% cis 1,4 units, 20% trans 1,4 and about 10%, 1,2 vinyl units.

The coupling-curing systems can include various types of polyfunctional curatives reactive with the end or side chain functional groups. The thiol or hydroxyl modified diene liquid prepolymers can be coupled and cured with polyisocyanates, polybasic acids, acid anhydrides, polyamines, or polybasic acid chlorides.

Preferably, the polyisocyanates are those represented by the general formula $R(NCO)_m$ wherein R is a polyvalent organic radical containing from 2 to 30 carbon atoms and $m$ is 2,3 or 4. R can be aliphatic, cycloaliphatic or aromatic. It is preferred that the organic radical be essentially hydrocarbon in character although the presence of unreactive groups containing elements other than carbon and hydrogen is permissible.

Examples of suitable compounds of this type include benzene 1,3-diisocyanate, hexane 1,6-diisocyanate, tolylene 2,4-diisocyanate (TDI), tolylene 2,3-diisocyanate, diphenylmethane 4,4'-diisocyanate naphthalene 1,5-diisocyanate, diphenyl 3,3'-dimethyl 4,4'-diisocyanate, diphenyl 3,3'-dimethoxy 4,4'-diisocyanate, 2,2'-diisocyanate diethyl ether, 3(diethylamino) pentane 1,5-diisocyanate, butane 1,4-diisocyanate, cyclohex-4ene 1,2-diisocyanate, benzene 1,3,4-triisocyanate, naphthalene 1,3,5,7-tetraisocyanate, naphthalene 1,3,7-triisocyanate, toluidine diisocyanate, isocyanate terminated prepolymers, polyaryl polysiocyanates, and the like.

A suitable commercial available polyaryl polyisocyanate is known as PAPI-1. This material has an average of 3 isocyanate groups per molecule and an average molecular weight of about 380.

Exemplary polybasic acids reactive with hydroxyl or thiol modified polymers of the invention include maleic acid, pyromellitic acid, succinic acid, phthalic acid, terephthalic acid, trimellitic acid, and the like. Acyl chlorides such as phthaloyl chloride, terephthalyl chloride and fumaryl chloride, can be utilized to couple the hydroxy groups of the prepolymer as can such compounds as dichloromethylphosphonic dichloride, and the like.

Isocyanate modified diene polymers and those containing allylic chlorine such as low molecular weight polychloroprenes are chain extended and cured with polyamines. Examples of such polyamines include tetraethylenepentamine, ethylenediamine, diethylenetriamine, triethylenetetramine, o-phenylenediamine, 1,2 - propanediamine, 1,2-butanediamine, piperazine, 1,2,3-benzenetriamine, 3,3'-biphenyl-diamine, 3,3-dichlorobenzidine, 4,4-dichlorobenzidine, 4,4-o-dichloroaniline, 4,4-methylenebischloraniline, methylene dianiline or N,N'bis (1,4-dimethylpentyl)-paraphenylenediamine. Amine terminated polyamides such as can be produced by condensation of polyamines with polybasic acids can also be used.

Urethane or ester linked polymers are formed when isocyanate or carboxyl modified diene polymers are cured with polyhydroxy compounds. These compounds can be either aliphatic or aromatic polyols or certain polyether products. Examples of such coupling-curing agents include glycerol, propylene glycol, neopentylglycol, pentaerythriatol, trimethanolethane, trimethanolpropane, butanediol or hexanetriol.

It is thus seen that an essentially diene elastomer is formed of a plurality of prepolymer elastomeric polydiene units joined by coupling reagents which condensed to form linking urethane, thiourethane, ester, urea, thiourea, aminoalkyl units or combinations thereof.

Generally, the coupler is present in the range of 75 to 150% of stoichiometric based on the functionality of the prepolymer. Polymers can be cured at temperatures from ambient to 500° F. although preferably they are curable in the range of 50° F. to 100° F. The time of cure can be anywhere from several minutes to several days, again depending upon the polymer being cured, the coupler and the temperature of the curing reaction. Curing can be accelerated by appropriate agents.

The curing is carried out after the prepolymer has been compounded with pigments, extenders, accelerators and an optional resinous adhesive material and worked up with solvent to a smooth liquid state. For short pot life materials, the coupling agent and the accelerator are not added until substantially immediately before the liquid is applied to the metal part.

In addition to the diene liquid prepolymer and the coupling agent, the maskant compositions typically can also contain an antioxidant such as a hindered phenol, or an aromatic amine such as phenylalphanapthylamine, a moisture scavenger such as activated alumina, silica or sodium aluminum silicate, an aromatic or polar plasticizer. Exemplary plasticizers are hydrocarbon oils such as a naphthenic oil, a chlorinated hydrocarbon oil such as an Arachlor product or a polyether or an ester such as dibutyl or dioctyl phthalate or tricresyl phosphate. A quantity of aromatic or low molecular weight solvent such as toluene or methyl ethyl ketone (MEK) may be present if required. All additives are present in amounts within ranges specified below to enhance the chemical and physical properties of the maskant.

Carbon black, titanium dioxide silica or various mineral silicate or carbonate fillers can be added to improve the tensile strength of the resultant maskant. However, with opaque filled maskants, it is difficult to see the scribe lines. It is therefore preferred that the final maskant be translucent as applied but capable of being rendered visible in regions of mechanical stress. These objectives can be secured by choosing fillers whereby the difference in refractive index of the filler $n_p$ (when contacted by the matrix polymer of the maskant) and the matrix $n_r$ is less than 0.5 in accordance with the teaching of my earlier Pat. No. 3,227,589. Preferred translucent pigments are calcium, magnesium or aluminum silicates although $SiO_2$ or calcium magnesium or zinc carbonates or others may be incorporated into the film. These fillers are preferably present in the range of 25 to 50 phr.

Adhesion of the maskant to the metal article can be modified by adding an adhesive resin to the formulation in an amount to give the desired adhesion. The amount utilized will vary with the amount of maskant forming diene prepolymer present and the type and condition of the surface being treated. However, excessive amounts should be avoided since that may cause improper handstripping properties. Use of amounts in the ranges given below results in satisfactory adhesion with good stripping qualities. The preferred adhesive resins are phenolics of the thermosetting type, suitably an alkyl phenoaldehyde resin such as a butyl or t-butyl phenoaldehyde resin. Many commercial forms of these resins are available such as Durez 13355 (Hooker Electro chemical).

The pot life of the formulation, speed of curing and properties of the final polymer are also influenced by the choice of accelerator and activator. The composition may further contain small amounts of conventional diene curatives such as sulfur compounds or free radical generating agents such as a peroxide or an azo compound such as diazobicyclooctane. The accelerator may further comprise an alkyl amine such as triethylamine, heavy metal esters such as tin dibutyldilaurate or stannous octoate. A metal oxide such as zinc or magnesium oxide may be included as an activator.

The following are typical urethane or urethane-urea linked diene elastomer formulations suitable for the "in situ" single application method of this invention:

TABLE I

| Example (phr.) | 1 | 2 | 3 | 4 |
|---|---|---|---|---|
| Polymer: | | | | |
| Liquid polybutadiene (OH) | 100 | | | |
| Liquid butadiene-25 styrene (OH) | | 100 | | |
| Liquid butadiene-15 acrylonitrile (OH) | | | 100 | |
| Liquid polybutadiene (SH) | | | | 100 |
| Filler | 5-100 | 5-100 | 5-100 | 5-100 |
| Plasticizer | 0-50 | 0-50 | 0-50 | 0-50 |
| Accelerator | 0.01-0.6 | 0.01-06 | 0.01-0.6 | 0.01-0.6 |
| Metal oxide activator | 0-10 | 0-10 | 0-10 | 0-10 |
| Moisture scavenger | 0-10 | 0-10 | 0-10 | 0-10 |
| Adhesive resin | 5-25 | 5-25 | 5-25 | 5-25 |
| Antioxidant | 0-2 | 0-2 | 0-2 | 0-2 |
| Solvent | 5-50 | 5-50 | 5-50 | 5-50 |
| Coupling-curing agent (polyisocyanate) | 10-25 | 10-25 | 10-25 | 10-25 |
| Diamine (modifier) | 0-9 | 0-9 | 5-9 | 5-9 |

The above polybutadienes have an equivalent weight of from about 1000 to 2000 and a functionality of slightly over 2. Where cured at 77° F. at 50% R.H., the polymers have the following properties:

TABLE II

| Example | 1 | 2 | 3 | 4 |
|---|---|---|---|---|
| Pot-life, min | 2-30 | 2-30 | 2-30 | 2-30 |
| Tack free time, min | 15-60 | 30-60 | 15-45 | 60-90 |
| Cure time to develop rubbery film, min | 60 | 90 | 60 | 120 |
| Tensile, p.s.i | 600-900 | 600-1,000 | 700-1,000 | 500-800 |
| Elongation, percent | 200-300 | 200-400 | 150-200 | 200-300 |
| Chemical resistance: | | | | |
| 6 hrs. in 10% caustic at 190° F | No effect | No effect | No effect | 30% loss in tensile. |
| 6 hrs. in 10% NCl at 130° F | 30% loss in tensile | 20% | 30% | 50% |
| 6 hrs. in 10% HNO³ at 130° F | Surface embrittlement | Same | Same | Polymer disintegrated. |
| 6 hrs. in boiling water | No effect | No effect | 20% loss in tensile | 30% loss in tensile. |
| Peel adhesion-clad Al, lbs | 0.75-2 | 1-3 | 1-3 | 1-3 |

It has further been found that the addition of certain amounts of diamines to polyisocyanate coupled hydroxyl or thiol modified polymer systems results in urethane-urea or thiourea linked final polymers of improved chemical resistance. For example, if the formulation of Example 1 is modified to contain 0-9 phr. and preferably less than 5 phr. of diamine corresponding to a $NH_2:OH$ ratio of less than 1 and preferably less than 0.5, the following changes of properties result, when cured with TDI at 77° F., 50% R.H. for 24 hours with a $NCO:NH_2+OH$ ratio of 1.1.

TABLE III

| Example | 1 | 1a | 1b | 1c | 1d | 1e | 1f |
|---|---|---|---|---|---|---|---|
| Diamine, phr.: | | | | | | | |
| 3,3' dichlorobenzidine | 0 | 1 | 2 | 3 | 4 | 5 | 6 |
| 4,4'-methylenebis-chloroaniline | 0 | 1 | 2 | 3 | 4 | 5 | 6 |
| N,N'-bis (1,4 dimethylpentyl) paraphenylenediamine | 0 | 1 | 2 | 3 | 4 | 5 | 6 |
| Methylene dianiline | 0 | 1 | 2 | 3 | 4 | 5 | 6 |
| Tensile, p.s.i | 600 | 600 | 660 | 750 | 900 | 1,200 | 1,100 |
| Elongation, percent | 200 | 200 | 250 | 300 | 250 | 200 | 175 |
| 300% modulus | | | | 750 | | | |
| Percent tensile change, 10% caustic at 190° F. for 6 hrs | −15 | −10 | 0 | 0 | 0 | −20 | −30 |

Certain diisocyanates are found to give better overall physical, chemical and adhesive properties in the resultant film. In a series of experiments with hydroxy modified polybutadiene having a 0.1 excess of isocyanate cured at 77° F. and 50% R.H. for 24 hours the following results were recorded:

TABLE IV

| Example | 1 | 2 | 3 | 4 | 5 | 6 |
|---|---|---|---|---|---|---|
| Polyisocyanate: | | | | | | |
| Toluene diisocyanate (80/20 isomer) | X | | | | | |
| 4,4'-diphenylene diisocyanate | | X | | | | |
| Polymethyl polyphenylene diisocyanate | | | X | | | |
| Toluidine diisocyanate | | | | X | | |
| Isocyanate terminated prepolymer (such as CB-75 Mobay Chemical) | | | | | X | |
| Hexamethylene diisocyanate | | | | | | X |
| Properties: | | | | | | |
| Tensile, p.s.i | 600 | 700 | 950 | 850 | 600 | 550 |
| Elongation, percent | 300 | 350 | 250 | 300 | 350 | 175 |
| Percent tensile change in 10% caustic, 190° F. for 6 hrs | −20 | −15 | −20 | −10 | −20 | −25 |

It is apparent that films with polymeric polyaryl isocyanates and toluidine isocyanates form films with optimum properties. The above isocyanate compositions are room temperature curing. Heating to 250° F. results in a 50% drop in elongation, 20-50% increase in modulus, virtually no change in tensile and a considerable improvement in chemical resistance. The pot life of these compositions can be substantially lengthened by the use of blocked polyisocyanates that are activated by heat or moisture. A suitable type of blocked polyisocyanate are the phenol blocked isocyanate materials such as Mondur SH, (Mobrey) or Hylene MP (Dupont) phenol blocked MDI or Isonate 123P (Upjohn).

The maskant forming materials of the invention can be applied by spraying, forced flowing, dipping or brushing a coating of the composition onto a substrate such as an aluminum, magnesium, ferrous, beryllium or other metal alloy and the film is cured during and after application to the substrate. Suitable equipment that can be utilized is a two component dispersing type spray gun in which the compounded polybutadiene is metered at a desired ratio and the curing agent is simultaneously metered and mixed in a small chamber seconds before being sprayed. The mixed components are deposited as a smooth uniform film that cures within 1-24 hours at ambient temperature or with heat if required.

The deposition of a smooth high solids film that is cured in place may also be effected with a modified prepolymer method in which the short chain liquid prepolymer is prereacted with an excess of coupling agent to form a polymer product with 4-9% of available functional groups from the coupling agent. The prepolymer is then compounded with pigments, adhesive resin, solvent and accelerator similar to the one-step procedure. Final curing is effected by adding a further coupling agent.

For example, a hydroxyl or thiol modified polybutadiene may be reacted with an excess of toluene diisocyanate to form 4-9% of —NCO groups. The prepolymer is compounded and then cured with a diamine, a diol, a triol or even some additional hydroxyl or thiol modified polybutadiene or mixtures thereof may be utilized as chain extending and/or cross-linking agents.

Again, the properties are dependent somewhat on the choice and concentration of coupling and accelerating agents and the properties are again substantially improved with the preferred $NH_2$:OH ratio of less than 1.

A series of maskants were prepared to show that within the stated ranges, a wide variety of accelerators will provide suitable maskant compositions.

EXAMPLE

To one hundred parts of a hydroxyl modified polybutadiene having an equivalent weight of 1300 and a functionality of slhigtly over two, were added 22 phr. of TDI and after reaction to form a polymer product containing 6% —NCO, the composition was compounded with filler, plasticizer oil, solvent and moisture scavenger and antioxidant in amounts previously specified. The composition was then cured for 24 hours at 77° F., 50% R.H. with the following catalysts. The curing-coupling agent in each case was 1,2 butane diol and 3% of 4,4 dichlorobenzidine.

TABLE V

| Example | 1 | 2 | 3 | 4 | 5 | 6 | 7 |
|---|---|---|---|---|---|---|---|
| Type and phr. catalyst: | | | | | | | |
| Dibutyl tin dilaurate | 0.01 | 0.1 | 0.2 | | | | |
| Stannous octoate | | | | 0.1 | 0.4 | | |
| Diazobicyclooctane | | | | | | 0.2 | |
| Triethylamine | | | | | | | 0.5 |
| Properties: | | | | | | | |
| Tensile, p.s.i | 650 | 780 | 1,250 | 400 | 750 | 800 | 950 |
| Elongation, percent | 450 | 400 | 350 | 300 | 450 | 450 | 350 |
| Percent tensile change, 10% caustic, 190° F., 6 hrs | 20 | 15 | 15 | 10 | 5 | 15 | 20 |

Due to the resistance of the maskant of the invention to both acidic and basic chemicals and further because of the adherence to the substrate to avoid leakage even after adjacent areas have been cut and peeled, the maskants also are very effective in processes for the selective addition of metal whether from electroless or electrolytic baths. The maskants, for example, can be utilized in the plating of nickel, copper, gold, silver, cobalt or zinc onto metal bases such as alloys of aluminum, magnesium, ferrous, beryllium or other metals.

The following procedures are illustrative of techniques to be followed in the utilization of the maskants of the invention in selective plating onto metal substrates.

EXAMPLE
Chromate conversion coating

An aluminum (2024–T3) panel (10 cm. x 15 cm.) was prepared by degreasing, caustic etching for 30 seconds at 70° C., rinsing, treating in 50% by volume $HNO_3$ and then rinsing again.

After the panel was dried, a 10 mil film of the hydroxy polybutadiene polyisocyanate and diamine cured maskant film of Example 3 of Table IV was applied and cured. A pattern was scribed into the film and peeled.

The panel was immersed for five minutes in the following solution of 25° C., pH 1.5 for 5 minutes,

| | G/l. |
|---|---|
| Chromic anahydride | 5 |
| Potassium ferricyanide | 1 |
| Barium nitrate | 1.9 |
| Sodium fluosilicate | 1.35 |

A chromium conversion coating was deposited on the panel in the exposed areas. The panel was removed from the plating bath, drained, rinsed and dried at ambient conditions. The remainder of the maskant film was removed from the panel by peeling and the plated pattern was clearly defined and the maskant covered areas showed no sign of plating or attack by the plating solution.

This procedure was repeated with a steel panel coated with maskant and then selectively stripped in areas before being immersed in an electrolytic chromium bath containing 250 g./l. chromic acid with a sulfuric acid concentration of 1 to 1.5% at a current density range of about 500 amp./ft.$^2$ and a temperature of 122–131° F. A bright, hard, clearly defined chromium deposit was produced on the maskant stripped areas, the remainder of the plate being free of corrosion or deposition.

From the foregoing it is evident that the compositions of the invention can be modified substantially to tailor make maskants of desired ambient or high temperature curing properties and varying physical properties suitable for particular chemical milling or plating applications. The high solids, low solvent compositions of the invention are efficiently applied in a single step to form a uniform film of 5 to 20 mil thickness without bubbling or cobwebbing and avoiding the delays, expense and hazard of multiple applicatoin and evaporation of excessive amounts of solvent. The final films are adherent, abrasion resistant, extensible resistant to etchant or plating bath chemicals and are cuttable and peelable to expose the surface to be etched or plated. Hence, it is apparent that the invention constitutes a marked improvement over prior art compositions and techniques.

It is further to be understood that preferred embodiments have been disclosed and that the numerous modifications and alterations are possible without departing from the scope of the invention defined in the claims that follow:

What is claimed is:

1. A chemical milling process comprising the steps of:
   (a) applying to an area of the surface of a metal workpiece a liquid maskant forming composition including no more than 50% by weight of solvent and at least 50% by weight of resin forming solids comprising a cross-linkable and chain extendable liquid diene prepolymer having an equivalent weight of from 1000 to 5000 and containing from 2 to 5 fuctionally reactive end and side groups selected from the group consisting of hydroxyl, thiol, carboxyl, isocyanate and halogen, said composition being applied in sufficient quantity to form in a single application a final film of a thickness of from 5 to 20 mils;
   (b) curing said prepolymer in place on said surface by a coupling reaction with a polyfunctional cross-linking and chain extending curing agent containing functional groups reactive with the functional groups on said polymer selected from at least one member of the class consisting of a polyisocyanate, polyol, polyamine, polybasic acid, polybasic acid anhydride and polybasic acid chloride to form a continuous, solid, elastomeric, etchant-resistant film adherent to and peelable from said surface;
   (c) removing a portion of the maskant film to expose the surface of the workpiece; and
   (d) etching the exposed area.

2. A process according to claim 1 in which said composition contains at least 70% of resin forming solids.

3. A process according to claim 2 in which the diene contains 4 to 12 carbon atoms.

4. A process according to claim 1 containing hydroxyl or thiol modified diene liquid prepolymers of equivalent weight of from about 1000 to 2000 and a functionality of greater than 2 and less than 3 and the curing agent is a combination of a polyisocyanate and a polyamine such that the ratio of $NH_2$:OH or SH is less than 1 and and NCO:$NH_2$OH or SH ratio is from 0.8 to 1.2.

5. A process according to claim 4 in which the $NH_2$:OH ratio is less than 0.5.

6. A method according to claim 1 in which the curing is effected at ambient temperature.

7. A method according to claim 1 in which the composition contains more than 70% by weight of resin forming solids.

8. A method according to claim 1 in which the cured film contains solid polymers of a molecular weight in excess of 20,000.

9. A method according to claim 1 in which the final film is translucent but capable of being rendered visible in mechanically stressed areas.

10. A method according to claim 1 in which thiol or hydroxyl modified diene polymers are cured with a heat activated blocked polyisocyanate.

11. A method according to claim 1 in which the liquid prepolymer and polyfunctional curing agent are separately and simultaneously sprayed onto the workpiece.

12. A method according to claim 1 in which thiol and hydroxyl modified prepolymer is prereacted with a polyisocyanate to form an intermediate product containing 4–9% isocyanate groups and the intermediate is then reacted with at least one of a polyol or a polyamine.

13. A process according to claim 9 in which the composition contains 0–100 p.h.r. of a filler having a refractive index differing from the film refractive index by less than 0.5.

14. A process according to claim 13 in which the filler is 25–50 p.h.r. of a magnesium, calcium or aluminum silicate.

References Cited

UNITED STATES PATENTS

| | | | |
|---|---|---|---|
| 2,888,335 | 5/1959 | Adkins et al. | 156—12 |
| 3,227,589 | 1/1966 | Deutsch | 156—13 |
| 3,084,141 | 4/1963 | Kraus et al. | 260—94.7 (N) UX |
| 3,109,871 | 11/1963 | Zelinski et al. | 260—94.7(N) UX |

JACOB H. STEINBERG, Primary Examiner

U.S. Cl. X.R.

156—12; 117—5.5, 6, 8; 204—15; 260—94.7